E. UHLIG & K. BAUCH.
CHUCK.
APPLICATION FILED JUNE 6, 1914.
1,154,898.
Patented Sept. 28, 1915.
2 SHEETS—SHEET 1.
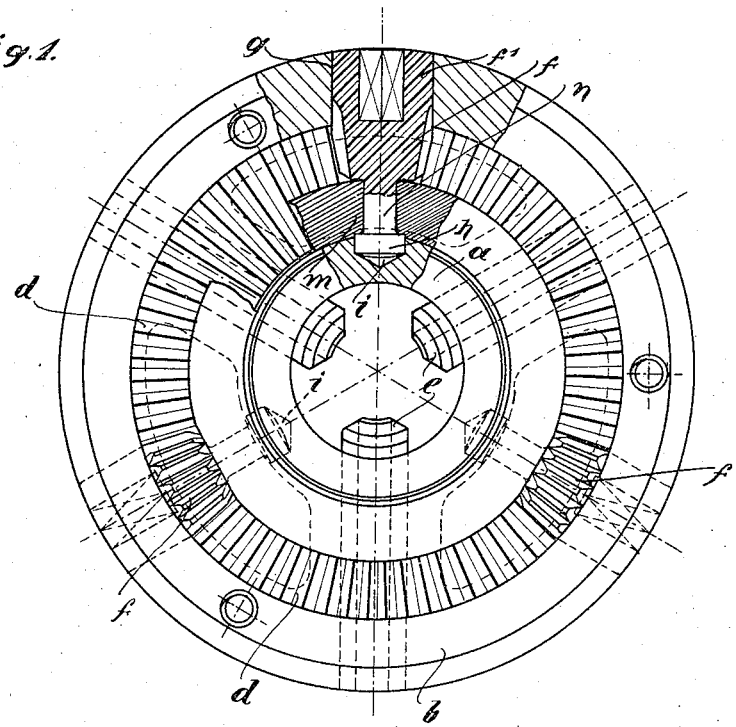
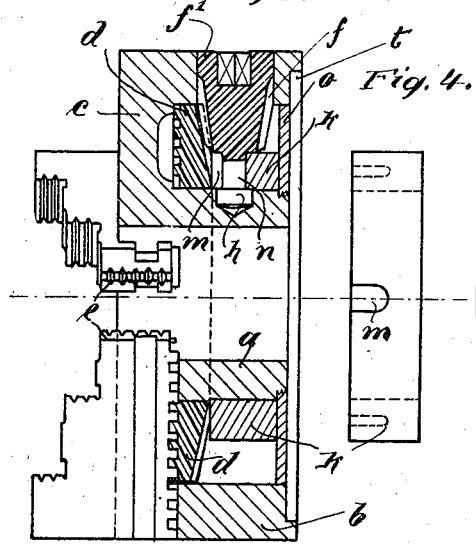
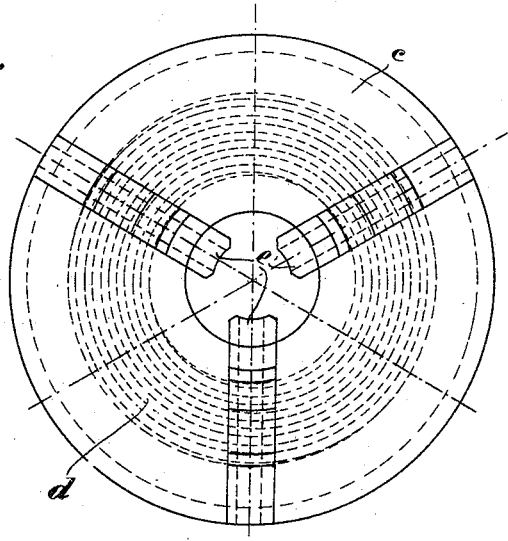
WITNESSES
W. A. Sinden
C. A. Walter
INVENTORS
ERNST UHLIG AND KURT BAUCH
by R. Hadden
Attorney E. UHLIG & K. BAUCH.
CHUCK.
APPLICATION FILED JUNE 6, 1914.
1,154,898.
Patented Sept. 28, 1915.
2 SHEETS—SHEET 2.
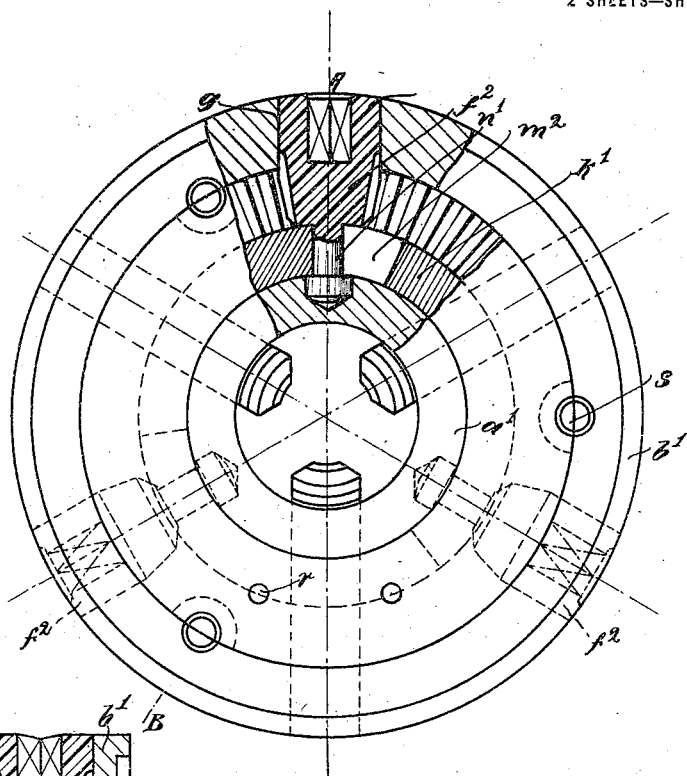
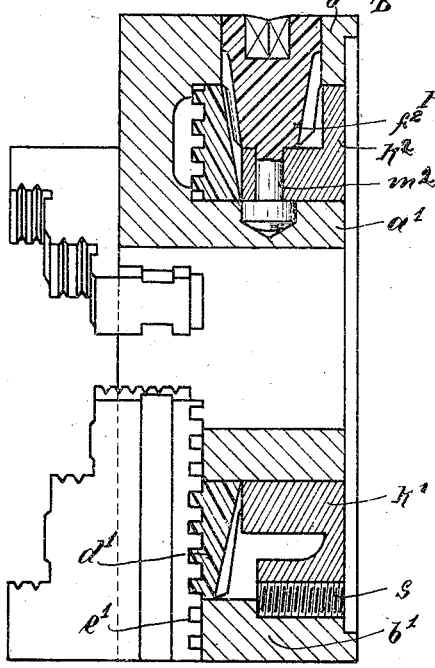
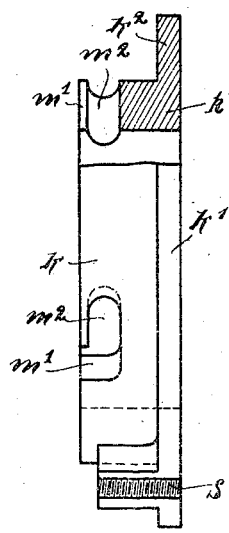
WITNESSES
W. A. Sinden
C. A. Walter
INVENTORS
ERNST UHLIG and KURT BAUCH
by C. Hadden
Attorney

UNITED STATES PATENT OFFICE.

ERNST UHLIG AND KURT BAUCH, OF GERA-UNTERMHAUS, GERMANY.

CHUCK.

1,154,898.  Specification of Letters Patent.  Patented Sept. 28, 1915.

Application filed June 6, 1914. Serial No. 843,863.

*To all whom it may concern:*

Be it known that we, ERNST UHLIG and KURT BAUCH, citizens of the German Empire, both residing at Gera-Untermhaus, in Germany, have invented certain new and useful Improvements in Chucks, of which the following is a specification.

This invention relates to chucks, more especially for lathes, drilling, milling and similar machine tools, of the type in which toothed jaws mesh with a spiral thread on one face of a disk which is turned by means of bevel wheels mounted radially around the chuck body and meshing with bevel teeth on the other face of the disk.

The invention consists in improvements in the mounting and holding of the bevel wheels, and also in part to improvements in the construction of the said wheels, resulting in increased strength and stability of the chuck mechanism, improved wear, absence or reduction of noise, and simplicity of construction.

The invention is illustrated in the accompanying drawings, in which—

Figure 1 is a front view, partly in section of one form of the improved chuck, with the cover removed. Fig. 2 is a view of the opposite side of the chuck, to a smaller scale. Fig. 3 is a cross section of the chuck, and Fig. 4 shows a detail thereof. Fig. 5 is a front view of another form of the improved chuck, partly in section. Fig. 6 is a section on the line A—B of Fig. 5, and Fig. 7 is a detail view of the ring.

Referring in the first instance to the construction shown in Figs. 1 to 4, the boss $a$ of the chuck and the outer part $b$ of the chuck housing are connected by, and integral with, the base plate $c$. The disk $d$ is rotatable on the boss $a$ and is provided on one of its faces with bevel teeth and on its other face with a spiral thread with which the correspondingly toothed jaws $e$ mesh.

The jaws are guided radially in the chuck housing, and can be moved radially inward and outward by rotating the disk $d$ in the known manner. The disk $d$ is rotated by means of the bevel wheels $f$, which are mounted radially in the chuck housing, and can be turned by a key inserted from the circumference of the housing.

The teeth of the bevel wheels gradually merge with cylindrical journals $f^1$ by means of which the wheels are mounted in bores $g$ of the housing, the journals $f^1$ being of the same diameter as the wheels at their bases. As the teeth of the bevel wheels are subjected to the greatest stresses at their outer ends, the gradual merging of the teeth into the journals effectively prevents the teeth from breaking off. The bevel wheels are provided at their inner ends with gudgeons $h$, which work in bores $i$ in the boss $a$, the bores $i$ and $g$ forming the bearings for the wheels. The latter are thus carried at each end in a bearing formed in a massive part, that is to say, having no gaps or apertures. The bearings consequently wear well, and being formed in the same body they permanently retain their positions in relation to each other.

Mounted on the periphery of the boss $a$ is a ring $k$ provided with slots $m$. The bevel wheels $f$ are provided with necks $n$, which are engaged with the slots $m$ in the ring $k$, and the latter abutting against the shoulders at the ends of the necks, prevents axial displacement of the bevel wheels. The ring $k$, which is prevented by the boss $a$ from moving laterally, may with advantage be made of steel instead of cast iron, the housing being generally made of the latter material, a steel ring is able to take the axial thrust of the bevel wheels without appreciable wear. The ring $k$ thus also assists in providing a good permanent bearing and guide for the bevel wheels, thereby preventing chattering of the latter. The ring $k$ is held in position by a cover plate or flange $o$, which is screwed on the end of the boss and holds the ring evenly against the toothed face of the disk $d$. The plate $o$ fits at its periphery in the chuck housing, which is provided on its rear face with a recess $t$ adapted to engage over the flange on the lathe or the like.

In the construction shown in Figs. 5 to 7, the jaws designated $e^1$, radially movable in the housing $b^1$, are actuated in the same way by means of bevel wheels $f^2$ and a disk $d^1$. The inner journals or necks $n^1$ of the bevel wheels work, as before, in slots in a ring, designated $k^1$, surrounding the boss $a^1$, but these slots, designated $m^1$ have continuations $m^2$, at right angles thereto, so that a bayonet joint slot is formed. After inserting the ring $k^1$, the same is rotated so that the slots $m^2$ are engaged with the necks $n^1$ of the bevel wheels, the ring being then held in position against axial movement by the necks, so that the ring and the bevel wheels hold each other in position.

The ring $k^1$ has a flange $k^2$ which fits into the chuck housing, thereby closing the latter. The flange $k^2$ is locked to the chuck housing by screws screwed into tapped holes $s$ in the ring and housing, one half of each tapped hole being in the ring and the other in the housing, and the said screws may also serve to fasten the chuck to the flange on the spindle of the lathe or the like. The flange $k^2$ is also provided with holes $r$ for the insertion of a key for turning the ring.

What we claim as our invention and desire to secure by Letters Patent of the United States is:—

1. In a chuck the combination of a housing having a cylindrical wall and a tubular boss within said wall, the latter having radial bores, jaws radially movable in said housing, gear wheels mounted in said radial bores having necks, means in said housing connecting said wheels to said jaws, for radial movement of the latter, and a detachable slotted ring fitting around said tubular boss, partly embracing the necks of said gear wheels with its slots, thereby retaining said wheels in said bores.

2. In a chuck the combination of a housing having a cylindrical wall and a tubular boss within said wall, the latter having radial bores, toothed jaws radially movable in said housing, bevel wheels mounted in said radial bores having necks, a rotatable disk in said housing having a spiral thread on one face, engaging said toothed jaws, and bevel teeth on the other face, engaging said bevel wheels, whereby said jaws can be radially moved, and a detachable slotted ring fitting around said tubular boss, partly embracing the necks of said bevel wheels with its slots, thereby retaining said wheels in said bores.

3. In a chuck the combination of a housing having a cylindrical wall and a tubular boss within said wall, the latter having radial bores and the boss having recesses in its outer circumference, toothed jaws radially movable in said housing, bevel wheels mounted in said radial bores, having necks, and gudgeons on said necks entering said recesses, a rotatable disk in said housing, having a spiral thread on one face, engaging said toothed jaws and bevel teeth on its other face engaging said bevel wheels, whereby said jaws can be radially moved, and a detachable slotted ring fitting around said tubular boss, partly embracing said necks with its slots and preventing axial movement of said wheels.

4. In a chuck the combination of a housing having a cylindrical wall and a tubular boss within said wall, the latter having radial bores, jaws radially movable in said housing, gear wheels mounted in said radial bores having necks, means in said housing connecting said wheels to said jaws, for radial movement of the latter, a detachable slotted ring fitting around said tubular boss, partly embracing the necks of said gear wheels with its slots retaining said wheels in said bores, and a flange between said ring and the wall of said housing, covering the interior of the latter.

5. In a chuck the combination of a housing having a cylindrical wall and a tubular boss within said wall, the latter having radial bores and the boss having recesses in its outer circumference, toothed jaws radially movable in said housing, bevel wheels mounted in said radial bores, having necks, and gudgeons on said necks entering said recesses, a rotatable disk in said housing, having a spiral thread on one face, engaging said toothed jaws and bevel teeth on its other face engaging said bevel wheels, whereby said jaws can be radially moved, and a detachable ring fitting around said tubular boss, having slots whereby it engages said necks and makes a bayonet joint therewith.

In witness whereof we have signed this specification in the presence of two witnesses.

ERNST UHLIG.
KURT BAUCH.

Witnesses:
   JULIUS SCHNABEL,
   CHARLES NEUER.